United States Patent
Husen et al.

(10) Patent No.: US 8,345,809 B2
(45) Date of Patent: Jan. 1, 2013

(54) RECEIVER APPARATUS FOR RECEIVING A MULTICARRIER SIGNAL

(75) Inventors: Sri Andari Husen, Eindhoven (NL); Alessio Filippi, Eindhoven (NL); Phjm van Voorthuisen, Sint Oedenrode (NL)

(73) Assignee: ST-Ericsson SA, Plan-les-Ouates (CH)

( * ) Notice: Subject to any disclaimer, the term of this patent is extended or adjusted under 35 U.S.C. 154(b) by 1021 days.

(21) Appl. No.: 11/917,043

(22) PCT Filed: Jun. 16, 2006

(86) PCT No.: PCT/IB2006/051940
§ 371 (c)(1),
(2), (4) Date: Dec. 15, 2008

(87) PCT Pub. No.: WO2006/134578
PCT Pub. Date: Dec. 21, 2006

(65) Prior Publication Data
US 2012/0039379 A1      Feb. 16, 2012

(30) Foreign Application Priority Data
Jun. 16, 2005 (EP) .................................. 05105282

(51) Int. Cl.
*H04B 1/10* (2006.01)
(52) U.S. Cl. .................................................... 375/350
(58) Field of Classification Search .......... 375/230–232, 375/260, 316, 340, 346, 350; 708/322–323
See application file for complete search history.

(56) References Cited

U.S. PATENT DOCUMENTS

| | | | |
|---|---|---|---|
| 7,366,088 B2* | 4/2008 | Bolinth et al. | 370/203 |
| 7,505,523 B1* | 3/2009 | Lee et al. | 375/260 |
| 7,752,430 B2* | 7/2010 | Dzung | 713/151 |
| 2002/0181549 A1 | 12/2002 | Linnartz et al. | |
| 2003/0058951 A1* | 3/2003 | Thomson et al. | 375/260 |
| 2004/0005010 A1* | 1/2004 | He et al. | 375/260 |

FOREIGN PATENT DOCUMENTS
WO      02067527 A2      8/2002

OTHER PUBLICATIONS

Yu, Fu, et al., "A New Scheme for PAPR Reduction in OFDM Systems with ICI Self-Cancellation," IEEE 2002, pp. 1418-1421.
Krongold, B. S. "A Method for Minimum-Interference OFDM Time Synchronization" Signal Processing Advances in Wireless Communications, 2003. SPAWC 2003 4TH IEEE Workshop on Rome, Italy Jun. 15-18, 2003, pp. 600-604.
Balamurali, N; et al "An Efficient Algorithm for Joint Carrier Frequency Offset and Channel Estimation in IEEE 802.16 OFDM Systems" Wireless Communication Systems, 2004, 1st International Symposium on Mauritius Sep. 20-22, 2004, pp. 428-432.

* cited by examiner

*Primary Examiner* — Khanh C Tran
(74) *Attorney, Agent, or Firm* — Coats & Bennett, P.L.L.C.

(57) ABSTRACT

In time varying OFDM systems, the effect of a non-ideal time synchronization may lead to a poor performance in terms of decoded average bit error rate versus the signal-to-noise ratio. The receiver apparatus (3) of the transmission system (1) estimates a subcarrier-dependent channel frequency response and determines an intercarrier interference spreading on the basis of a cyclic shift in symbols carried by the subcarriers. Therewith, an intercarrier interference included in an OFDM signal can be canceled, even in case of a non-ideal time synchronization.

17 Claims, 3 Drawing Sheets

RECEIVER APPARATUS FOR RECEIVING A MULTICARRIER SIGNAL

TECHNICAL FIELD

The present invention relates to a receiver apparatus for receiving a multicarrier signal comprising subcarriers, wherein symbols are modulated onto the subcarriers. More particularly, the present invention relates to a receiver apparatus for receiving a signal modulated according to a technique such as orthogonal frequency division multiplexing (OFDM), wherein symbols are modulated onto the subcarriers according to a modulation scheme such as quadrature amplitude modulation (QAM), especially 16-QAM or 64-QAM.

BACKGROUND

US 2002/0181549 A1 describes a multicarrier receiver with a channel estimator. Further, a transmission system for transmitting a multicarrier signal from a transmitter to the receiver is described. The channel estimator of the multicarrier receiver estimates amplitudes of the subcarriers and time derivatives of the amplitudes. Further, the receiver comprises an equalizer for canceling intercarrier interference included in the received multicarrier signal in dependence on the estimated amplitudes and time derivatives.

SUMMARY

It is an object of the invention to provide a receiver apparatus for receiving a multicarrier signal with an improved decoding performance. It is a further object of the invention to provide a transmission system for transmitting a multicarrier signal with an improved transmission performance.

These objects are solved by a receiver apparatus as defined in claim 1 and by a transmission system as defined in claim 8, respectively. Advantageous developments of the invention are mentioned in the dependent claims.

In an OFDM system, the subcarriers of a multicarrier signal are arranged orthogonal to each other so that the subcarriers can be separated from each other at the receiver apparatus. Further, the subcarriers do overlap, and in usual OFDM systems they overlap quite significantly. However, in the presence of a time-varying channel, the multicarrier signal suffers from intercarrier interference (ICI), i.e. at the receiver apparatus side the subcarriers of the multicarrier signal are no longer perfectly orthogonal to each other. A possible solution may be time synchronization, wherein in case of a discrete Fourier transform in signal processing, the time synchronization may be seen as a window positioning for the discrete Fourier transform (DFT). After time synchronization, the symbols modulated on the carriers may be derived by a detection algorithm including an ICI canceling method. To avoid intersymbol interference (ISI), the data block selected for DFT includes, if possible, only data belonging to a single transmitted symbol. Further, a cyclic shift of the DFT input data block may be provided to add extra robustness to the time synchronization method. However, as soon as the channel is time-varying, the cyclic shift and the time shift are not equivalent to each other so that further effort is required to cancel the intercarrier interference, especially in the presence of a non-ideal time synchronization. Thereby, the time shift due to the non-ideal positioning of the DFT window has no major impact on the ICI cancellation, but the cyclic shift has a major impact. Hence, an estimation unit of the receiver apparatus determines an intercarrier interference spreading on the basis of the cyclic shift of the symbols. Using this intercarrier interference spreading, an equalizer unit of the receiver apparatus is canceling or approximately canceling the intercarrier interference included in the multicarrier signal on the basis of the intercarrier interference spreading determined.

The intercarrier interference spreading may be described by an intercarrier interference spreading matrix, the compounds of which are phase adjusted, wherein the phase depends on a shift variable and the difference between a row number and a column number of the respective component of the intercarrier interference spreading matrix. Therewith, the presence of a non-ideal time synchronization is taken into account.

It is advantageous that the estimation unit determines a zeroth order time derivative and a first order time derivative of the channel frequency response for the subcarriers according to a first order approximation so as to estimate the channel frequency response. But, a second or higher order approximation may also be used and may be refined accordingly. It is advantageous that the same intercarrier spreading is used for parallel subcarriers, i.e. subcarriers transmitted parallel to each other at the air interface of the transceiver apparatus. The equalizer unit of the receiver apparatus determines a signal output on the basis of the sum of the zeroth order time derivative applied on the received symbols and the intercarrier interference spreading applied after a first order time derivative on the symbols. Therein, when the first order time derivative and the intercarrier interference spreading are regarded as mappings, the composition of the intercarrier interference spreading and the first order time derivative is applied onto that symbols. In case of a matrix description, a matrix for the intercarrier interference spreading is multiplied with a matrix of the first order time derivative according to the rules of matrix multiplication, and the result is multiplied with a vector comprising the symbols in form of complex valued numbers. This result is a vector of complex or real numbers that may be feed through a parallel-to-serial converter after the DFT, especially after a Fast Fourier Transform (FFT).

It is further advantageous that the estimation unit determines the intercarrier interference spreading matrix on the basis of a cyclic shift function and a fixed intercarrier interference spreading matrix. Thereby, the estimation unit determines an element in a specific row and a specific column of the intercarrier interference spreading matrix as a product of an element in the specific row and the specific column of the fixed spreading matrix and a complex value of the cyclic shift function, wherein this complex value is determined as a complex exponential of a product of an imaginary unit, two times Ludolf's number ($\pi = 3.1415 \ldots$), the shift variable and a fraction value consisting of a numerator that is a difference between the row number and the column number, and a denominator that is the total number of columns of the intercarrier spreading matrix or the total number of subcarriers. The total number of columns of the intercarrier spreading matrix is usually equal to the total number of subcarriers.

It is advantageous that the estimation unit estimates the first order time derivative of the channel frequency response as a subcarrier-dependent function of the first order time derivative. In particular, the first order time derivative of the channel frequency response may be estimated as a subcarrier-dependent first order time derivative. Hence, the receiver apparatus can take care of a time-varying subcarrier-dependent noise power to improve the reliability, especially the bit error rate (BER).

The first order time derivative may be estimated on the basis of zeroth order time derivatives of a symbol succeeding said specific symbol and a symbol preceding said specific symbol with respect to a time coordinate, respectively. Hence, the computational burden is reduced.

These and other aspects of the invention will be apparent from and elucidated with reference to the embodiments described hereinafter.

BRIEF DESCRIPTION OF THE DRAWINGS

The present invention will become readily understood from the following description of preferred embodiments thereof made with reference to the accompanying formulas and the accompanying drawings, in which like parts are designated by like reference signs and in which.

DETAILED DESCRIPTION

Figure 1:
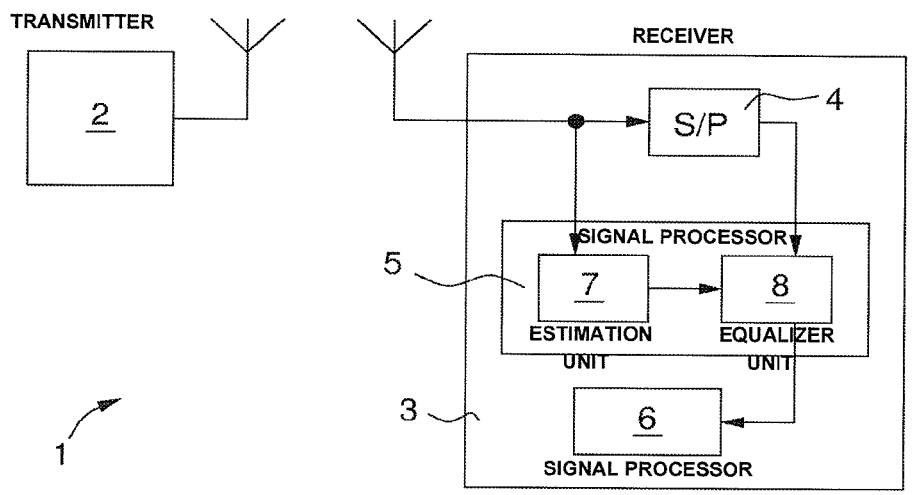
FIG. 1 shows a block diagram of a transmission system comprising a receiver apparatus according to an embodiment of the present invention.

FIG. 1 shows a block diagram of a transmission system 1 according to an embodiment of the present invention. The transmission system 1 comprises a transmitter apparatus 2 and a receiver apparatus 3. The transmission system 1 of the embodiment is arranged for orthogonal frequency division multiplexing using a QAM bit mapping scheme, especially 16-QAM or 64-QAM. But, the transmission system 1 may also be arranged for other multicarrier multiplexing methods and/or may also use other bit mappers such as phase shift keying (PSK). Hence, the receiver apparatus 3 is arranged for receiving a digitally modulated multicarrier signal carrying digital data over a fading channel. A possible application of the transmission system 1 and the receiver apparatus 3 of the embodiments of the present invention is a digital video broadcasting system such as the Terrestrial Digital Video Broadcasting system (DVB-T), in which an orthogonal frequency division multiplexing with 2 k subcarriers or 8 k subcarriers are provided. Other applications are indoor communication such as IEEE 802.11a/g/n and HIPERLAN/2, and cellular radio systems using a multicarrier modulation technique. The transmission system 1 and the receiver apparatus 3 are also applicable for transmitting or receiving a signal over a multipath channel that is frequency-selective. More particularly, the transmission system 1 and the receiver apparatus 3 are applicable when some components of the transmission system 1, especially the receiver apparatus 3, are moving, for example, when the receiver apparatus 3 is installed in or carried temporarily in a car, a train or another vehicle. But, the transmission system 1 and the receiver apparatus 3 of the invention can also be used for other applications.

The receiver apparatus 3 of the transmission system 1 provides a serial-to-parallel conversion and an discrete Fourier transform (DFT). Therewith, a number N of complex data symbols $a_n$, n=0, . . . , N−1, of the parallel data stream are modulated onto a number N of orthogonal subcarriers of a multicarrier signal by means of an N-point I-DFT to form a symbol with duration $T_u$. This symbol is further extended with a cyclic prefix of duration $T_G$ and subsequently transmitted. With the sampling period T and the number G of samples within the guard interval, the relations $T_u$=NT and $T_G$=GT hold. The subcarrier spacing is set to $f_s$=1/$T_u$. Hence, the samples s(qT) send over the air interface with an antenna of the transmitter apparatus 2 can be described as shown in formula (1).

Thereby, j is an imaginary unit, π is Ludolf's number, and the samples s(qT) for q=−G, . . . N−1 describe a possible method to fill the guard interval with samples from the end of the data block.

In formula (1) qT indicates the time variable. With a delayed position $i_1$T of the time varying path $h_1$(qT), and a finite duration of the impulse response, the received samples r(qT) received by the receiver apparatus 3 are obtained according to the convolution of the transmitted samples s(qT) with the channel impulse response and an additive white Gaussian noise (AWGN) η(qT) with two-sided spectral density $N_0$/2. When the maximum delay spread $i_{L-1}$T is at most equal to the duration $T_G$ of the guard interval, the received samples are as shown in formula (2).

The received samples r(qT) are received via an antenna of the receiver apparatus 3. The receiver apparatus 3 comprises a serial-to-parallel converter 4 (S/P) a signal processing part 5 and a further signal processing part 6 for further signal processing. The antenna of the receiver apparatus 3 is connected with the serial-to-parallel converter 4 and an estimation unit 7 of the signal processing part 5. The serial-to-parallel converter 4 performs a serial-to-parallel conversion of the samples r(qT) received via the antenna of the receiver apparatus 3 and forwards a vector of the received samples r(qT) to an equalizer unit 8 of the signal processing part 5. The estimator unit 7 is arranged to estimate properties of the channel, especially to estimate a subcarrier-dependent channel frequency response. Therefore, the estimator unit 7 estimates a zeroth order time derivative $H^{(0)}$ of the channel frequency response H for the subcarriers and a first order time derivative $H^{(1)}$ of the channel frequency response H for the subcarriers according to a Taylor expansion with respect to a specific time instance. Further, the estimation unit 7 determines an intercarrier interference spreading $\Xi^{(s)}$ on the basis of a cyclic shift that may be described by a shift variable s. The estimated zeroth order time derivative $H^{(0)}$ and the estimated first order time derivative $H^{(1)}$ and the intercarrier interference spreading $\Xi^{(s)}$ are output towards the equalizer unit 8.

The equalizer unit 8 comprises a DFT that may be implemented by a Fast Fourier Transform (FFT). A non-ideal time synchronization indicated by a time shift $q_{sh}$ in number of samples may be present in the signal input to the equalizer unit 8 after serial-to-parallel conversion so that the received symbol on a subcarrier m is as shown in formula (3).

The channel frequency response H on subcarrier N at time instance (q−$q_{sh}$)T can be described as shown in formula (4).

Hence, from formulas (1), (2), (3) and (4) the received symbol $y_n$ on subcarrier m is as shown in formula (5), wherein an equivalent noise component $η_m$ is used to describe the noise η on subcarrier m. The estimator unit 7 approximates the channel frequency response H with respect to a Taylor expansion. This Taylor expansion is preferably made with respect to the time instant $q_0$T, wherein $q_0$=(N−1)/2−$q_{sh}$. But, the Taylor expansion may also be derived with respect to another time instance. Hence, the time-varying channel frequency response H is approximated as shown in formula (6).

This first order approximation makes use of the zeroth order time derivative $H_n^{(0)}$ and the first order time derivative $H_n^{(1)}$ of the channel frequency response for subcarrier n evaluated at the time instance $q_0$T. With this approximation the received symbol $y_m$ on subcarrier m is shown in formula (7), wherein elements of a fixed intercarrier interference spreading matrix Ξ are defined according to the formula (8), and in formula (7) an equality sign is used instead of the approximation sign of formula (6). As shown in formula (8), the time shift $q_{sh}$ has no impact on the fixed intercarrier interference spreading matrix so that the time shift $q_{sh}$ can be corrected, for example, by defining a zeroth order and a first order time derivate of a shifted channel frequency response by including the exponential values shown in formula (7), respectively. Due to this redefinition, the value $q_0$ may then correspond to the middle of a selected DFT window. Further, a non-ideal time synchronization which does not introduce intersymbol interference has no major impact so that the main effect is a phase shift on each subcarrier which usually can be absorbed by the channel estimation performed by the estimation unit 7. Due to the fact that the first order time derivative $H^{(1)}$ exhibits the same phase shift, when the time synchronization remains constant for some OFDM symbols, the first order derivative of the channel frequency response $H^{(1)}$ can be estimated, for instance, as the difference between the channel frequency response H of consecutive OFDM symbols also in the presence of non-ideal time synchronization.

In formulas (5) and (6), a time shift is equivalent to a cyclic shift of the input data, because the signal is not time-varying and hence the DFT input is seen as periodic due to the cyclic prefix. Due to the fact that the time shift $q_{sh}$ can be corrected as described above with reference to formula (7), a vanishing time shift $q_{sh}=0$ can be assumed in the following without loss of generality.

When a cyclic shift described by the shift value s occurs, wherein the value of may count the number of samples of the cyclic shift, so that the last s samples of the DFT input become the first s samples, the output of the DFT applied by the equalizer unit 8 for the subcarrier m is shown in formula (9).

In formula (9) the sample $y_m$ for subcarrier m is defined either according to formula (5) or, as an approximation, according to formula (7). The intercarrier interference of the DFT output samples $y_m^{(s)}$ can be determined from the first order approximation term of formula (7) and can be written as shown in formula (10).

In formula (10) the first order time derivative $H_n^{(1)}$ is affected by the cyclic shift s in the same way as the zeroth order time derivative $H^{(0)}$ is affected by the time shift $q_{sh}$, as can be seen from formula (7). Further, the fixed intercarrier interference spreading matrix Ξ having components $\Xi_{m,n}$ is also affected by the cyclic shift described by the shift variable s, while it was not affected by the time shift $q_{sh}$. Hence, to take care of such an effect of the phase rotation, an intercarrier interference spreading matrix $\Xi^{(s)}$ is defined on the basis of the fixed intercarrier interference spreading matrix Ξ and the cyclic shift depending on the shift variable s according to formula (11).

It is noted that the intercarrier interference spreading matrix $\Xi^{(s)}$ describes a variable spreading. Hence, the time shift $q_{sh}$ and the cyclic shift described by the shift variable s have different influence on the modeling of OFDM systems using time varying channels.

In the following, a possible way to implement an intercarrier interference cancellation or at least a partial cancellation of intercarrier interference is described in further detail.

Figure 2:
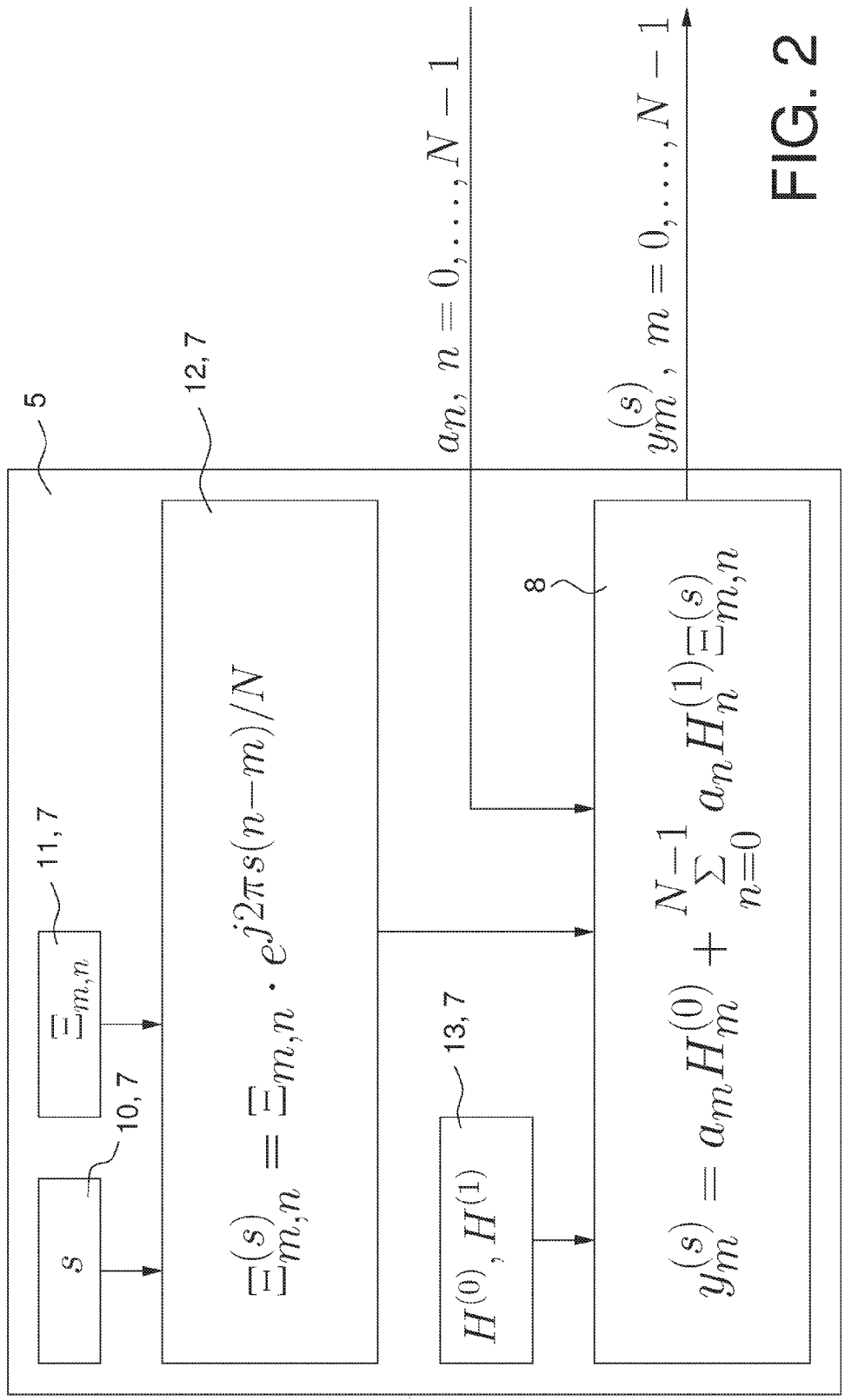
FIG. 2 shows a block diagram of an equalizer unit of the receiver apparatus of the transmission system according to a first embodiment of the present invention.

FIG. 2 shows the signal processing part 5 of the receiver apparatus 3 of the transmission system 1 according to a first preferred embodiment of the present invention. The cyclic shift that may vary over time is described by a shift variable s provided by a cyclic shift estimation part 10 of the estimation unit 7. the fixed intercarrier interference spreading matrix Ξ is calculated by a determination part 11 of the estimation unit 7 according to formula (8). The shift variable s and the fixed intercarrier interference spreading matrix Ξ are input to a calculation part 12 of the estimation unit 7 of the signal processing part 5. Then, the calculation part 12 calculates an intercarrier interference spreading matrix $\Xi^{(s)}$ on the basis of the fixed intercarrier interference spreading matrix Ξ and the shift variable s according to formula (11). The intercarrier interference spreading matrix $\Xi^{(s)}$ calculated is output towards the equalizer unit 8 of the signal processing part 5.

A zeroth order time derivative $H^{(0)}$ and first order time derivative $H^{(1)}$ of the channel frequency response are determined or estimated by an estimation part 13 of the estimation unit 7 and output towards the equalizer unit 8. Further, data symbols $a_n$, n=0, . . . , N−1 are input to the equalizer unit 8 from the serial-to-parallel converter 4. Then, the equalizer unit 8 determines a vector of samples $y^{(s)}$ comprising the samples $y_m^{(s)}$ for all subcarriers m according to formula (12), and outputs the vector of symbols $y_m^{(s)}$ to the further signal processing part 6 for further signal processing.

Figure 3:
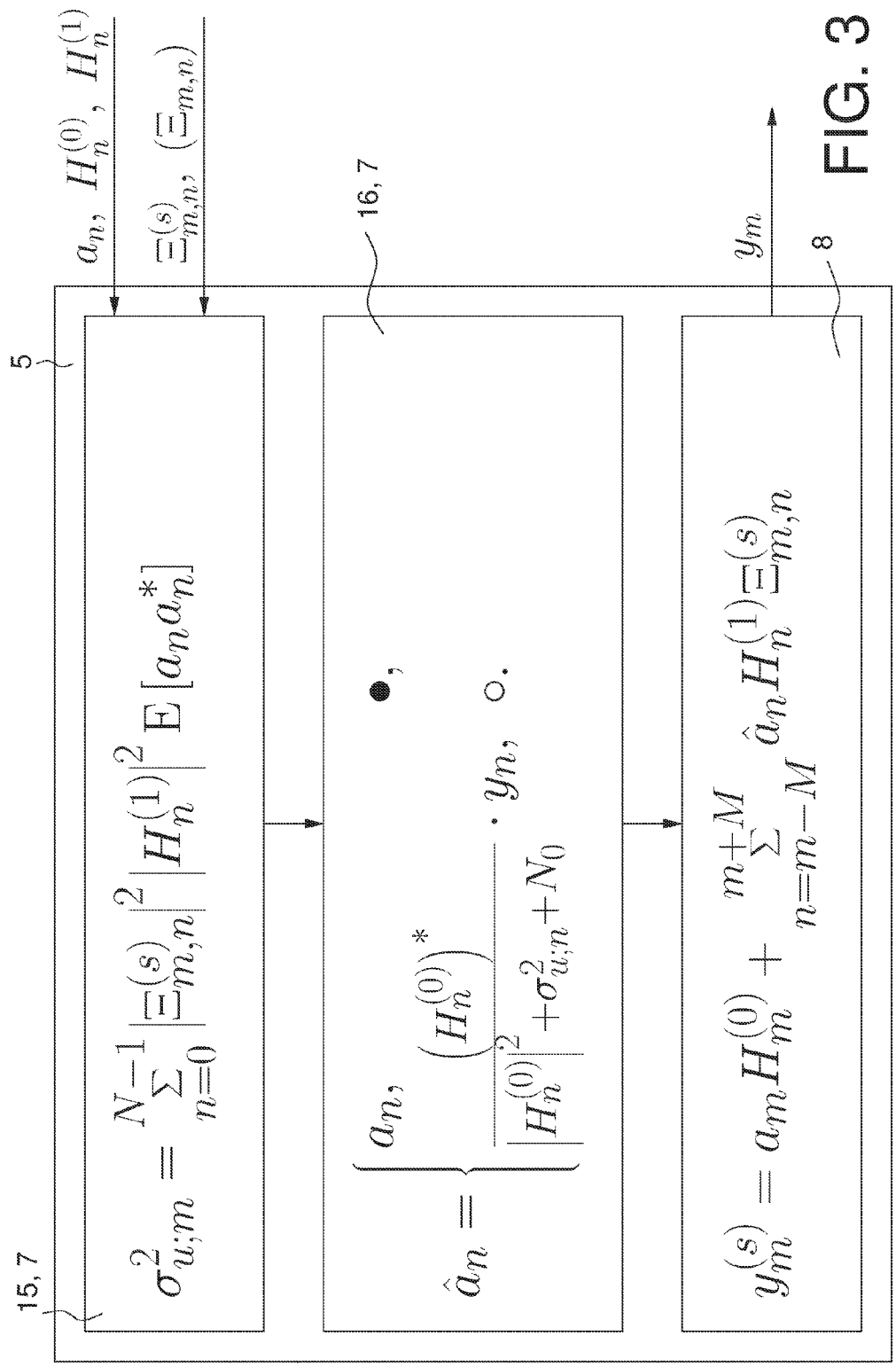
FIG. 3 shows an equalizer unit of a receiver apparatus of a transmission system according to a second embodiment of the present invention.

FIG. 3 shows a signal processing part 5 of the receiver apparatus 3 of the transmission system 1 according to a second embodiment of the present invention. Thereby, a vector of data symbols a comprising data symbols $a_n$ for each of the subcarriers, a zeroth order and a first order time derivative $H^{(0)}$ and $H^{(1)}$, respectively, of the channel frequency response are input to an intercarrier interference power estimation part 15 of the estimation unit 7. Further, the intercarrier interference spreading matrix $\Xi^{(s)}$ is input to the intercarrier interference power estimation part 15. Further, depending on the specific implementation, the fixed intercarrier interference spreading matrix Ξ may also be input to the intercarrier interference power estimation part 15. The intercarrier interference power estimation part 15 calculates an intercarrier interference power as shown in formula (13), wherein $E[a_n a_n^*]$ is a real valued estimation for the symbol $a_n$ times $a_n^*$, * denotes the complex conjugate, and instead of the intercarrier interference spreading matrix $\Xi^{(s)}$ the fixed intercarrier interference spreading matrix Ξ may be used in the calculation. The intercarrier interference power $\sigma_{u;m}^2$ for all subcarriers M is output towards a calculation unit 16 of the estimation unit 7. A calculation unit 16 determines an auxiliary value $\hat{a}_n$ as $a_n$, if $a_n$ is a symbol from a pilot subcarrier, and otherwise it determines the auxiliary value as shown in formula (14).

This formula is also shown in FIG. 3, wherein the case of a pilot symbol is denoted by a filled circle and the other case is denoted by an unfilled circle. The auxiliary values $\hat{a}_n$ are output towards the equalizer unit 8. The equalizer unit 8 calculates a vector of symbols $y^{(s)}$ comprising components $y_m^{(s)}$ according to formula (15), and outputs this vector $y^{(s)}$ towards the further signal processing part 16 for further signal processing.

Thereby, the summation in formula (15) is made with respect to at most 2 m+1 subcarriers so that the intercarrier interference originating from the 2M closest subcarriers is canceled. With respect to a possible large number of subcarriers, the computational burden is further reduced.

In a specific application, setting M=2 may provide a good performance in terms of coded average bit error rate (BER) versus the signal-to-noise ratio (SNR), while reducing the computational burden.

Figure 4:
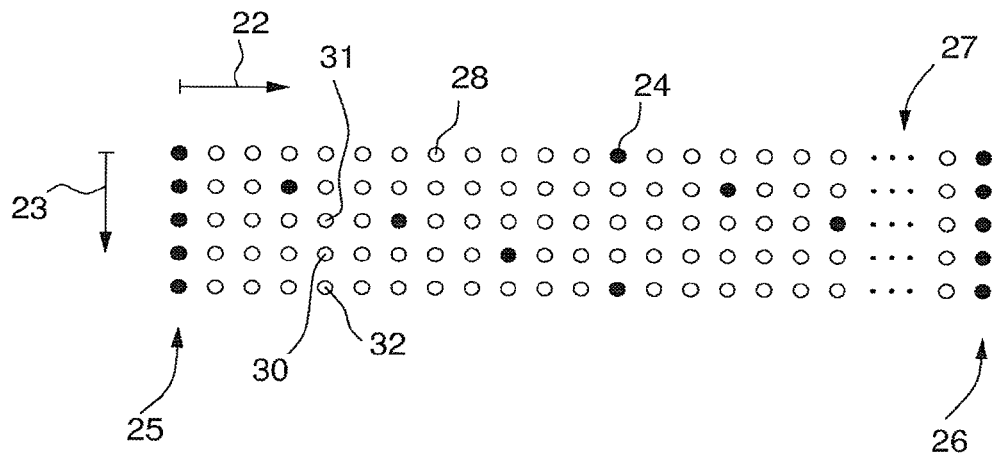
FIG. 4 shows an orthogonal frequency division multiplexing symbol allocation diagram for illustrating the embodiments of the present invention.

FIG. 4 shows an orthogonal frequency division multiplexing symbol allocation diagram, in which subcarriers are shown by filled and unfilled circles. Each row of the subcarriers is ordered with respect to a frequency coordinate 22 and each column of the subcarriers is ordered with respect to a time coordinate 23. The pilot subcarriers are shown by filled circles, wherein one of these pilot subcarriers is characterized by the reference sign 24. Each row of the subcarriers belongs to one orthogonal frequency division multiplexing symbol. Hence, the first column 25 consists of the pilot subcarriers of the first active subcarriers after the Fast Fourier Transform for each of the orthogonal frequency division multiplexing symbols. Further, the last column 26 consists of the pilot subcarriers of the last active subcarriers of each of the orthogonal frequency division multiplexing symbols after the Fast Fourier Transform. Each row of subcarriers consists of a plurality of subcarriers, for example, in the order of 8.000 active subcarriers, as shown by the three dots 27 in each of the shown rows. The pilot subcarriers represented by the pilot subcarriers 24 between the first column 25 and the last column 26 are scattered. But, this pilot subcarriers 24 can also be arranged in line according to the time coordinate 23 or be arranged in another way.

The user data is carried by symbols modulated onto the subcarriers denoted by the unfilled circles, one of which is characterized by the reference sign 28. Hence, the data subcarriers represented by the data subcarrier 28 are the subcarriers which are not pilot subcarriers 24.

The estimation unit 7 may estimate the first order time derivative $H^{(1)}$ of the channel frequency response as an approximation or, especially, as a function of the zeroth order time derivative $H^{(0)}$ of the channel frequency response. For example, the estimation unit 7 can calculate the first order time derivative $H^{(1)}$ for subcarrier 30 as a function of the zeroth order time derivative $H^{(0)}$ at a subcarrier 31 preceding subcarrier 30 and a zeroth order time derivative $H^{(0)}$ at a subcarrier 32 succeeding subcarrier 30. More specific, the estimation unit 7 determines the first order time derivative $H^{(1)}$, approximately, as a function of a square value of the absolute value of the difference of the zeroth order time derivative $H^{(0)}$ at the succeeding subcarrier 32 and the zeroth order time derivative $H^{(0)}$ at the preceding subcarrier 31. With a similar operation, the estimation unit 7 estimates the first order time derivative $H^{(1)}$ for the other subcarriers in the same row as the subcarrier 30. Hence, the components $H^{(1)}$ of the first order time derivative $H^{(1)}$ for all subcarriers m in the same row as the subcarrier 30 can be estimated by a simple calculation to further reduce the computational burden.

It is noted that the zeroth order time derivative matrix and the first order time derivative matrix can be defined as diagonal matrixes so that the product of the zeroth order time derivative matrix and a vector of the symbols as well as the product of the intercarrier interference spreading matrix and the first order time derivative matrix, and the product of the result of the latter product and the vector of the symbols are each defined according to the rules of matrix multiplication.

Although exemplary embodiments of the invention have been disclosed, it will be apparent to those skilled in the art that various changes and modifications can be made which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

LIST OF FORMULAS $$s(qT) = \frac{1}{\sqrt{N}} \sum_{n=0}^{N-1} a_n e^{j2\pi nq/N}, q = -G, \ldots, N-1 \quad (1)$$

$$r(qT) = \sum_{l=0}^{L-1} h_l(qT) s(qT - i_l T) + \eta(qT) \quad (2)$$

$$y_m = \frac{1}{\sqrt{N}} \sum_{q=0}^{N-1} r(qT - q_{sh}T) e^{-j2\pi qm/N} \quad (3)$$

$$H_n((q-q_{sh})T) = \sum_{l=0}^{L-1} h_l((q-q_{sh})T) e^{-j2\pi n i_l/N} \quad (4)$$

$$y_m = \frac{1}{N} \sum_{q=0}^{N-1} \sum_{n=0}^{N-1} H_n((q-q_{sh})T) a_n \cdot e^{j2\pi(n-m)q/N} e^{-j2\pi n q_{sh}/N} + \eta_m \quad (5)$$

$$H_n((q-q_{sh})T) \approx H_n^{(0)}(q_0T) + H_n^{(1)}(q_0T)((q-q_{sh})T - q_0T) \quad (6)$$

$$y_m = a_m H_m^{(0)}(q_0T) e^{-j2\pi m q_{sh}/N} + \sum_{n=0}^{N-1} a_n H_n^{(1)}(q_0T) e^{-j2\pi n q_{sh}/N} \Xi_{m,n} + \eta_m \quad (7)$$

$$\Xi_{m,n} = \frac{1}{N} \sum_{q=0}^{N-1} \left( qT - \frac{N-1}{2} T \right) e^{j2\pi(n-m)q/N} \quad (8)$$

$$y_m^{(s)} = y_m e^{-j2\pi sm/N} \quad (9)$$

$$u_m = \sum_{n=0}^{N-1} a_n H_n^{(1)}(q_0T) e^{-j2\pi sn/N} \cdot \Xi_{m,n} e^{j2\pi s(n-m)/N} \quad (10)$$

$$\Xi_{m,n}^{(s)} = \Xi_{m,n} e^{j2\pi s(n-m)/N} \quad (11)$$

$$y_m^{(s)} = a_m H_m^{(0)} + \sum_{n=0}^{N-1} a_n H_n^{(1)} \Xi_{m,n}^{(s)} \quad (12)$$

$$\sigma_{u;m}^2 = \sum_{n=0}^{N-1} |\Xi_{m,n}^{(s)}|^2 \cdot |H_n^{(1)}| \cdot E[a_n a_n^*] \quad (13)$$

$$\hat{a}_n = \frac{(H_n^{(0)})^*}{|H_n^{(0)}|^2 + \sigma_{u;m}^2 + N_0} \cdot y_n \quad (14)$$

$$y_m^{(s)} = a_m H_m^{(0)} + \sum_{n=m-M}^{m+M} \hat{a}_n H_n^{(1)} \Xi_{m,n}^{(s)} \quad (15)$$

The invention claimed is:

1. A receiver apparatus configured to receive a multicarrier signal comprising subcarriers, wherein multiple symbols are modulated onto the subcarriers, the receiver apparatus comprising:
    an estimation unit configured to:
        estimate a subcarrier-dependent channel frequency response;
        determine an intercarrier interference spreading on the basis of a cyclic shift in the symbols by determining a zeroth order time derivative of the channel frequency response for the subcarriers and at least a first order time derivative of the channel frequency response for the subcarriers according to a first or higher order approximation so as to estimate the channel frequency response; and an equalizer unit configured to at least approximately canceling an intercarrier interference included in the multicarrier signal received on the basis of at least the channel frequency response estimated and the determined intercarrier interference spreading.

2. The receiver apparatus according to claim 1, characterized in that the estimation unit is configured to determine the intercarrier interference spreading on the basis of an intercarrier interference spreading that is fixed for parallel subcarriers and the cyclic shift, and that the equalizer unit is configured to determine a signal output on the basis of the sum of the zeroth order time derivative applied on the symbols and the intercarrier interference spreading applied after the first order time derivative on the symbols.

3. The receiver apparatus according to claim 2, wherein the estimation unit is configured to estimate the first order time derivative of the channel frequency response as a subcarrier-dependent first order time derivative.

4. The receiver apparatus according to claim 3, wherein the estimation unit is configured to estimate the first order time derivative of the channel frequency response for a specific symbol as a difference of a zeroth order time derivative of the channel frequency response for a symbol succeeding the specific symbol with respect to a time coordinate and a zeroth order time derivative of the channel frequency response for a symbol preceding the specific symbol with respect to the time coordinate.

5. The receiver apparatus according to claim 1, wherein the estimation unit is configured to determine the zeroth order time derivative of the channel frequency response for the subcarriers as a matrix for the zeroth order time derivative of the channel frequency response, the first order time derivative of the channel frequency response for the subcarriers as a matrix for the first order time derivative of the channel frequency response, the fixed intercarrier interference spreading as a matrix for the fixed intercarrier interference spreading, and the cyclic shift as a complex-valued function depending on a shift variable and the subcarriers, that the estimation unit is configured to determine a matrix for the intercarrier interference spreading on the basis of the cyclic shift function and the fixed intercarrier interference spreading matrix, the equalizer unit is configured to determine a vector of the signal output as a sum of a product of the matrix for the zeroth order time derivative of the channel frequency response and a vector of the symbols of the subcarriers, and a product of the matrix for the intercarrier interference spreading, the matrix for the first order time derivative of the channel frequency response and the vector of the symbols of the subcarriers.

6. The receiver apparatus according to claim 5, wherein the estimation unit is configured to determine the intercarrier interference spreading matrix so that an element in a specific row and a specific column is calculated as a product of an element in the specific row and the specific column of the fixed spreading matrix and a complex value of the cyclic shift function, wherein the complex value of the cyclic shift function is determined as a complex exponential function of a product of an imaginary unit, two times Ludolf's number, the shift variable and a fraction value consisting of a numerator that is a difference between the row number and the column number, and a denominator that is the total number of columns of the intercarrier spreading matrix or the total number of subcarriers.

7. The receiver apparatus according to claim 1, wherein the equalizer unit is configured to at least approximately cancels the intercarrier interference of each of the subcarriers on the basis of an intercarrier interference from at most a predetermined number of adjacent subcarriers.

8. A transmission system configured to transmit a multicarrier signal from a transmitter apparatus to a receiver apparatus, wherein the multicarrier signal comprises subcarriers, wherein the transmitter apparatus is configured to modulate symbols on the subcarriers, and wherein the receiver apparatus is arranged according to claim 1.

9. A receiver apparatus configured to receive a multicarrier signal comprising subcarriers, wherein multiple symbols are modulated onto the subcarriers, the receiver apparatus comprising:
an estimation unit configured to:
estimate a subcarrier-dependent channel frequency response; and
determine an intercarrier interference spreading on the basis of a cyclic shift in the symbols; and
an equalizer unit for at least approximately canceling an intercarrier interference included in the multicarrier signal received on the basis of at least the channel frequency response estimated and the determined intercarrier interference spreading,
wherein the estimation unit is configured to determine the zeroth order time derivative of the channel frequency response for the subcarriers as a matrix for the zeroth order time derivative of the channel frequency response, the first order time derivative of the channel frequency response for the subcarriers as a matrix for the first order time derivative of the channel frequency response, the fixed intercarrier interference spreading as a matrix for the fixed intercarrier interference spreading, and the cyclic shift as a complex-valued function depending on a shift variable and the subcarriers, that the estimation unit is configured to determine a matrix for the intercarrier interference spreading on the basis of the cyclic shift function and the fixed intercarrier interference spreading matrix, the equalizer unit is configured to determine a vector of the signal output as a sum of a product of the matrix for the zeroth order time derivative of the channel frequency response and a vector of the symbols of the subcarriers, and a product of the matrix for the intercarrier interference spreading, the matrix for the first order time derivative of the channel frequency response and the vector of the symbols of the subcarriers.

10. A receiving method for receiving a multicarrier signal comprising subcarriers, wherein multiple symbols are modulated onto the subcarriers, the method comprising:
estimating a subcarrier-dependent channel frequency response;
determining an intercarrier interference spreading on the basis of a cyclic shift in the symbols by determining a zeroth order time derivative of the channel frequency response for the subcarriers and at least a first order time derivative of the channel frequency response for the subcarriers according to a first or higher order approximation so as to estimate the channel frequency response; and
approximately canceling an intercarrier interference included in the multicarrier signal received on the basis of at least the channel frequency response estimated and the determined intercarrier interference spreading.

11. The method according to claim 10, further comprising:
determining the intercarrier interference spreading on the basis of an intercarrier interference spreading that is fixed for parallel subcarriers and the cyclic shift; and
determining a signal output on the basis of the sum of the zeroth order time derivative applied on the symbols and the intercarrier interference spreading applied after the first order time derivative on the symbols.

12. The method according to claim 11, further comprising estimating the first order time derivative of the channel frequency response as a subcarrier-dependent first order time derivative.

13. The method according to claim 12, further comprising estimating the first order time derivative of the channel frequency response for a specific symbol as a difference of a zeroth order time derivative of the channel frequency response for a symbol succeeding the specific symbol with respect to a time coordinate and a zeroth order time derivative of the channel frequency response for a symbol preceding the specific symbol with respect to the time coordinate.

14. The method according to claim 10, further comprising:
determining the zeroth order time derivative of the channel frequency response for the subcarriers as a matrix for the zeroth order time derivative of the channel frequency response, the first order time derivative of the channel frequency response for the subcarriers as a matrix for the first order time derivative of the channel frequency response, the fixed intercarrier interference spreading as a matrix for the fixed intercarrier interference spreading, and the cyclic shift as a complex-valued function depending on a shift variable and the subcarriers;
determining a matrix for the intercarrier interference spreading on the basis of the cyclic shift function and the fixed intercarrier interference spreading matrix; and
determining a vector of the signal output as a sum of a product of the matrix for the zeroth order time derivative of the channel frequency response and a vector of the symbols of the subcarriers, and a product of the matrix for the intercarrier interference spreading, the matrix for the first order time derivative of the channel frequency response and the vector of the symbols of the subcarriers.

15. The method according to claim 14, further comprising:
determining the intercarrier interference spreading matrix so that an element in a specific row and a specific column is calculated as a product of an element in the specific row and the specific column of the fixed spreading matrix and a complex value of the cyclic shift function, wherein the complex value of the cyclic shift function is determined as a complex exponential function of a product of an imaginary unit, two times Ludolf's number, the shift variable and a fraction value consisting of a numerator that is a difference between the row number and the column number, and a denominator that is the total number of columns of the intercarrier spreading matrix or the total number of subcarriers.

16. The method according to claim 10, further comprising approximately canceling the intercarrier interference of each of the subcarriers on the basis of an intercarrier interference from at most a predetermined number of adjacent subcarriers.

17. The method according to claim 10, further comprising transmitting a multicarrier signal from a transmitter apparatus to a receiver apparatus, wherein the multicarrier signal comprises subcarriers, wherein the transmitter apparatus is configured to modulate symbols on the subcarriers.

* * * * *